(12) United States Patent
Kwast

(10) Patent No.: US 6,608,953 B2
(45) Date of Patent: Aug. 19, 2003

(54) OPTICAL CABLE HAVING A METALLIC CORE WITH A CHANNEL CONTAINING AN OPTICAL WAVEGUIDE

(75) Inventor: Ekkehard Kwast, Solingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/773,567

(22) Filed: Feb. 2, 2001

(65) Prior Publication Data

US 2001/0019650 A1 Sep. 6, 2001

(30) Foreign Application Priority Data

Feb. 4, 2000 (DE) .......................... 100 05 077

(51) Int. Cl.[7] ................................... G02B 6/44
(52) U.S. Cl. ........................ 385/109; 385/102
(58) Field of Search ................. 385/100–113; 174/70 R, 95–97, 103, 108

(56) References Cited

U.S. PATENT DOCUMENTS

| 4,416,508 A | * | 11/1983 | Dey et al. ................. 385/110 |
| 4,741,470 A | * | 5/1988 | Winter et al. ............ 385/109 X |
| 4,767,182 A | * | 8/1988 | Parfree et al. ............... 385/107 |
| 4,790,623 A | * | 12/1988 | Winter et al. ................ 385/109 |
| 4,836,639 A | * | 6/1989 | Shamoto et al. ............. 385/109 |
| 4,993,805 A | * | 2/1991 | Abe et al. .................... 385/109 |
| 5,495,546 A | * | 2/1996 | Bottoms, Jr. et al. ........ 385/101 |

FOREIGN PATENT DOCUMENTS

| DE | 44 38 691 A1 | 5/1996 |
| DE | 196 10 011 A1 | 9/1997 |
| EP | 0 410 735 A2 | 1/1991 |
| EP | 0 538 698 A1 | 4/1993 |
| EP | 0 109 149 A1 | 5/1994 |
| JP | 60-24511 | 2/1985 |

OTHER PUBLICATIONS

"Transfil Europe", No. 35, Mar. 1996, p. 62–67.

* cited by examiner

Primary Examiner—Lynn Feild
Assistant Examiner—Son V. Nguyen
(74) Attorney, Agent, or Firm—Sughrue Mion, PLLC

(57) ABSTRACT

In an optical cable consisting of a metallic core (1) with at least one channel (2), which extends in the longitudinal direction of the core (1) and in which at least one optical waveguide (13) is arranged, the at least one channel (2) is arranged within the sheath encasing the core (1) and is closed to the exterior.

17 Claims, 1 Drawing Sheet

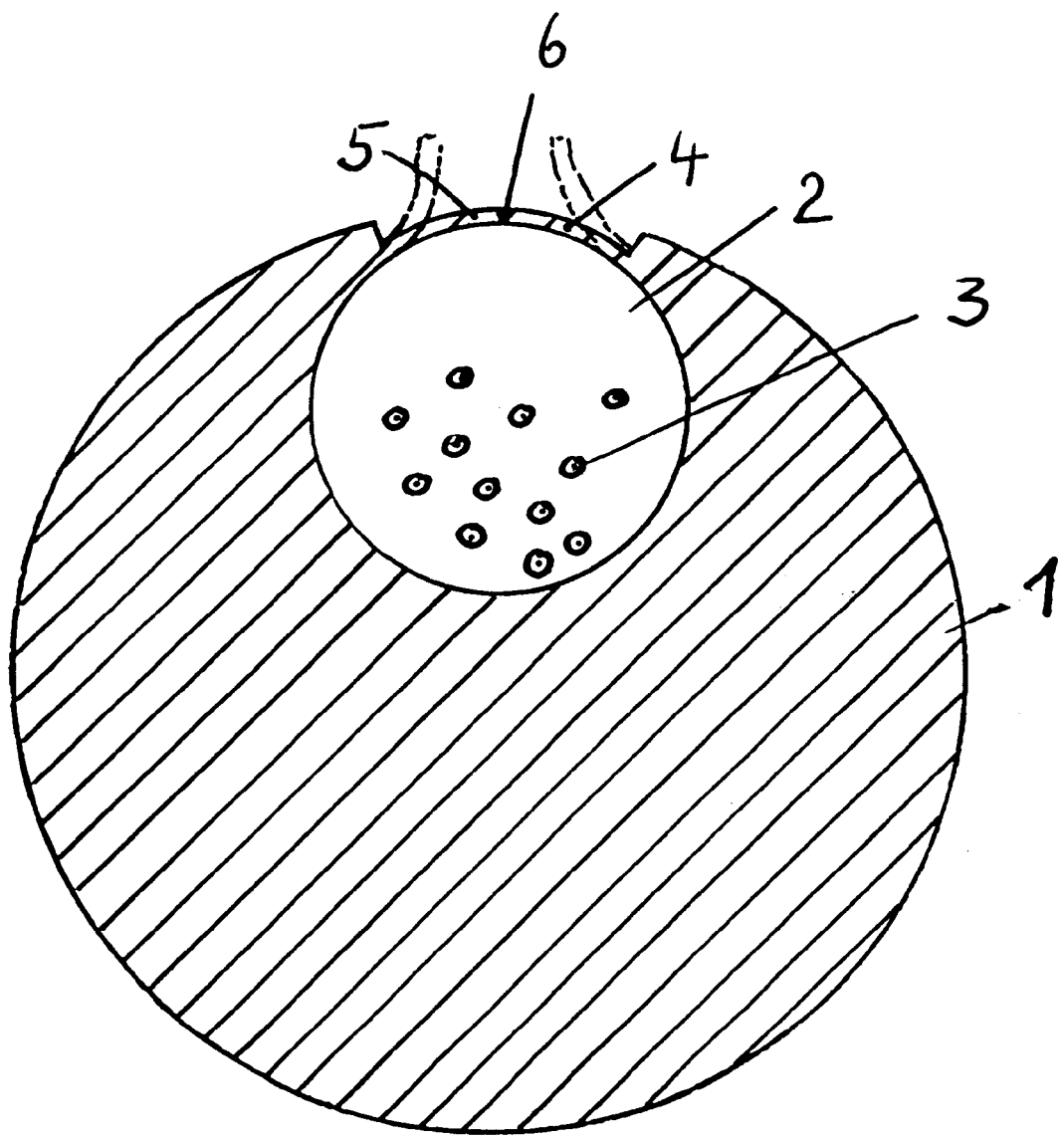

OPTICAL CABLE HAVING A METALLIC CORE WITH A CHANNEL CONTAINING AN OPTICAL WAVEGUIDE

BACKGROUND OF THE INVENTION

The invention relates to an optical cable according to the preamble of claim 1.

Sometimes it is neither technically possible nor economically effective to use cables installed underground or in conduits. This can be the case in rural areas with a low population density, in areas with rocky subsoil and in mountainous areas. In such situations there is reason to use aerial cables.

Metal-free aerial cables have become known, these being chiefly installed in areas affected by frequent storms or electromagnetic influences. Non-metallic, self-supporting aerial cables can also be used in high-voltage networks. Such cables must withstand the heavy mechanical demands of these applications and be easily installable.

The disadvantages of metal-free aerial cables consist in that strong electric fields produced by high-voltage lines cause severe ageing of the protective, synthetic resin sheath. This ageing leads to the premature destruction of the protective sheath and thus to the destruction of the non-metallic aerial cable. Therefore their use is very limited. Further disadvantages are additional loading of the mast system and the different expansion coefficients of non-metallic aerial cables and metallic phase cables. A further disadvantage consists of the different sag behaviour under ice- and/or wind stress which likewise restricts the use of dielectric aerial cables.

Additionally, due to the tension elements which must be provided, the cross-section of the metal-free aerial cables is relatively large, so that such cables have a particularly high wind resistance.

Conventional overhead cables containing optical waveguides have become known. One embodiment consists in that one wire of the cable is replaced by a metal tube with exactly the same dimension as the wire, at least one optical waveguide being arranged in the metal tube. Such cables are used as earthing conductors or also as phase cables. They have the disadvantage that the number of optical waveguides which can be accommodated is limited.

"Transfil Europe" No. 35, March 1996, p. 62–67 has disclosed an aerial cable composed of a circular aluminium profile into which outwardly open grooves are introduced. So-called multifibre buffer tubes, i.e. synthetic resin tubes with optical waveguides extending therein are accommodated in these grooves. A plurality of densely packed steel wires provided with an aluminium coating are arranged on the circular aluminium profile. The steel wires essentially serve as strain relief elements. Additionally they prevent the buffer tubes from becoming displaced from the grooves.

SUMMARY OF THE INVENTION

The object of the invention is to provide an aerial cable which has a small cross-section together with a large number of fibres. Furthermore the optical waveguides are to be very substantially externally protected from mechanical, chemical and thermal attack.

This object is achieved by the features described in the characterising clause of claim 1.

BRIEF DESCRIPTION OF THE DRAWINGS

The invention will be explained in detail in the form of the exemplary embodiment schematically illustrated in the FIGURE.

DETAILED DESCRIPTION OF THE INVENTION

The optical cable consists of an aluminium profile 1 preferably produced by extrusion moulding, a channel 2 extending in the aluminium profile 1, and various optical waveguides 3 arranged in the channel 2. The channel 2 is closed to the exterior, and specifically by the two flaps 4 and 5, the ends of which are connected by a seam 6.

The outer diameter of the aluminium profile 1 amounts to less than 6 mm. With an outer diameter of the aluminium profile 1 of 6 mm, the diameter of the channel 2 amounts to approximately 3–4 mm, so that approximately forty eight optical waveguides 3 are accommodated in the channel 2.

The optical cable illustrated in the Figure has a compact construction and a high resistance to transverse pressure.

The cable is expediently produced in such manner that firstly a circular profile 1 having a channel 2 arranged eccentrically but within the cross-section of the profile and composed of aluminium or an aluminium alloy is produced by extrusion moulding.

Following the cooling of the profile 1, the channel 2 is opened and the flaps 4 and 5 are bent up outwards. The optical waveguides 3 are inserted into the now open channel 2, the raised flaps 4 and 5 indicated in broken lines in the Figure are formed downwards thereby closing the channel 2, and the edges of the flaps 4 and 5 are welded to one another. The welding of the seam 6 preferably takes place by high-frequency welding. This process is characterised in that the welding heat is concentrated on the welding seam and thus does not damage the optical waveguides 3. Furthermore, production speeds of up 60 m/min can be achieved.

A further advantage consists in that a stable position of the welding seam is unnecessary. This means that satisfactory welding is possible in spite of the rotation of the core. This is particularly advantageous if more than one channel (2) must be welded and if the excess length of the fibres is achieved by rotating the core. The welding takes place when the flaps 4 and 5 contact one another in the high-frequency energy field. This is independent of the position in the cylindrically-symmetric field.

The excess length of the optical waveguides 3 in the channel 2 is expediently achieved in that the optical waveguides 3 are inserted into the channel 2 in the form of a coil.

The number of channels 2 in the profile can be selected to be virtually arbitrary although the distribution of the channels 2 should be uniform, considered in the peripheral direction.

The optical cable according to the theory of the invention is suitable for various applications.

Thus for example it can be used at the centre of a submarine cable, in which case one or more layers of tension elements are stranded onto the profile 1. In this case the profile 1 can be used as an electric conductor for the power supply of amplifiers.

A particularly advantageous sphere of use is as so-called attached cables, where a cable is attached along an already existing line or cable. It can be attached by lashing, stranding, winding with a strip etc. In this application a particular advantage of the optical cable according to the invention is that on the one hand no corrosion occurs if the cable is attached to an earthing wire or conductor made of aluminium, and on the other hand there is virtually no temperature restriction.

In addition, the cable's good flexibility and high resistance to transverse pressure are advantageous here, resulting in a simple installation.

The optical cable according to the theory of the invention can also be used as an earth wire and as a phase conductor in high-voltage installations.

What is claimed is:

1. An optical cable comprising:

a metallic core with at least one channel which extends in the longitudinal direction of the core, at least one optical waveguide being arranged in said channel, wherein said channel is within the core, wherein a thin-walled region is present between a portion of said channel and a portion of a peripheral surface of said core and said thin-walled region has a seam extending in a direction substantially parallel to the longitudinal axis of said channel and closes said channel, and wherein a narrow arch-shaped gap at the portion of the peripheral surface of the core is present above the thin-walled region.

2. An optical cable according to claim 1, characterised in that the metallic core has a circular cross-section.

3. An optical cable according to claim 1, wherein the channel has a circular cross-section.

4. An optical cable according to claim 1, wherein the channel is arranged eccentrically relative to the centre of the core.

5. An optical cable according to claim 1, wherein the core is an extrusion-moulded profile made of aluminium or an aluminium alloy.

6. An optical cable according to claim 1, wherein the seam is closed by welding.

7. A process for the production of an optical cable according to claim 1, wherein firstly a metallic circular profile with a closed channel extending in the longitudinal direction of the circular profile and arranged eccentrically relative to the centre of the circular profile is produced by extrusion, that the channel is opened at a thin wall region, that at least one optical waveguide is inserted into the channel, and that the channel is closed.

8. A process according to claim 7, characterised in that the opening of the channel is performed without cutting and the thin wall components are formed outwards.

9. A process according to claim 8 wherein following insertion of said optical waveguide, wall components are reformed into said wall components' original state and are welded at said wall components' seam.

10. A process according to claim 9, characterised in that the seam is closed by high-frequency welding.

11. A method of producing an optical cable comprised of a metallic core containing at least one channel in which at least one optical waveguide is arranged, said method comprising:

first producing by extrusion a metallic circular profile with a closed channel extending in the longitudinal direction of the circular profile and arranged eccentrically relative to the center of the circular profile; and opening said channel at a thin-walled region of said metallic core, inserting at least one optical waveguide into said channel, and closing said channel.

12. An optical cable comprising:

a metallic core containing at least one channel extending in said core's longitudinal direction;

at least one optical waveguide arranged inside said channel; and a thin-walled region present between a portion of said channel and a portion of a peripheral surface of said core, said thin-walled region having a seam extending in a direction substantially parallel to the longitudinal axis of said channel, and wherein a narrow arch-shaped gap at the portion of said peripheral surface of the core is present above the thin-walled region.

13. A method of producing an optical cable comprised of a metallic core containing at least one channel extending in said core's longitudinal direction, and at least one optical waveguide arranged in said channel, said method comprising:

producing by extrusion a metallic profile with said channel, said channel being closed and arranged eccentrically relative to the center of the profile;

opening said channel at a thin-walled region present between a portion of said channel and a portion of a peripheral surface of said channel; and inserting said at least one optical waveguide into said channel.

14. A method according to claim 13, wherein said channel is opened by a process free of cutting.

15. A method according to claim 13, wherein after said opening of said channel and before said inserting of said at least one waveguide, components of said thin-walled region extend outward.

16. A process according to claim 13, wherein the thickness of said thin wall components is substantially uniform along a circumferential direction of said profile.

17. An optical cable comprising:

metallic core means for containing at least one channel means extending in the core's longitudinal direction; and said channel means for containing at least one optical waveguide, wherein a thin-walled region is present between a portion of said channel means and a portion of a peripheral surface of said metallic core means and said thin-walled region has a seam extending in a direction substantially parallel to the longitudinal axis of said channel means, and wherein a narrow arch-shaped gap at the portion of the peripheral surface of the core is present above the thin-walled region.

* * * * *